United States Patent [19]

Förster

[11] 4,299,159
[45] Nov. 10, 1981

[54] DIAPHRAGM CAPSULE FOR PRESSURE MONITORS

[75] Inventor: Wolfgang Förster, Neunburg, Fed. Rep. of Germany

[73] Assignee: Elektromanufaktur Zangenstein Hanauer GmbH & Co., Zangenstein, Fed. Rep. of Germany

[21] Appl. No.: 82,259

[22] Filed: Oct. 5, 1979

[30] Foreign Application Priority Data

Oct. 13, 1978 [DE] Fed. Rep. of Germany ... 7830603[U]

[51] Int. Cl.³ .............................................. F16J 3/02
[52] U.S. Cl. .................................. 92/98 R; 73/715; 220/4 B; 220/306
[58] Field of Search ............... 92/98 R, 98 D; 73/715; 220/4 B, 306

[56] References Cited

U.S. PATENT DOCUMENTS

| 2,667,184 | 1/1954 | Hailer | 92/98 R |
| 2,959,194 | 11/1960 | Mercier | 92/98 R |
| 3,593,958 | 7/1971 | Mueller | 92/98 R |
| 3,769,879 | 11/1973 | Lofquist, Jr. | 92/98 R |
| 4,136,603 | 1/1979 | Doyle, Jr. | 92/98 R |

FOREIGN PATENT DOCUMENTS

| 2155255 | 5/1973 | Fed. Rep. of Germany | 92/98 D |
| 2326415 | 12/1973 | Fed. Rep. of Germany | 92/98 D |

*Primary Examiner*—Abraham Hershkovitz
*Attorney, Agent, or Firm*—Karl W. Flocks

[57] ABSTRACT

Figure 1:
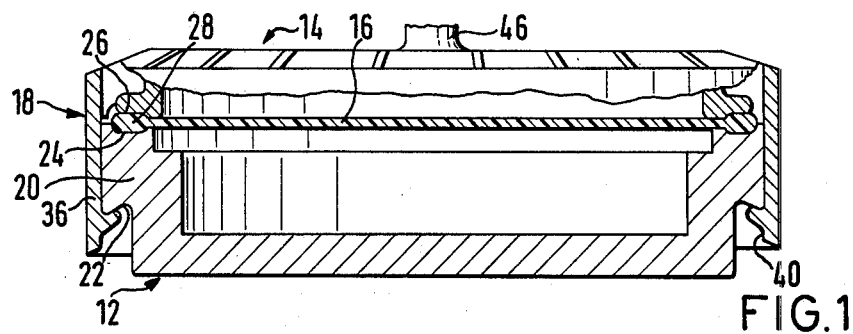

A diaphragm capsule for pressure monitors comprises a capsule body 12 and a capsule cap 14 with a diaphragm 16 clamped between the two. The capsule cap 14 and a ring 18 are formed integrally of plastics by injection molding and joined by webs 30. The ring 18 is subdivided into resilient segments 36 by slots 34 located below the webs 30. At their inner sides the segments 36 each have a nose 38 by means of which they are locked behind an annular shoulder 22 formed at the capsule body 12. Between the resilient segments 36 and the capsule cap 14 spaces 32 are left free whose dimensions in a plane parallel to the diaphragm 16 are just as large as the dimensions of the nose 38 underneath which are parallel to said first dimensions. (FIG. 1)

1 Claim, 3 Drawing Figures

DIAPHRAGM CAPSULE FOR PRESSURE MONITORS

This invention relates to a diaphragm capsule for pressure monitors, comprising a capsule body and a capsule cap between which a diaphragm is clamped at its edge, and a ring secured to the capsule cap holding together said body and cap by engaging over an annular shoulder at the capsule body.

Diaphragm capsules of this kind are widely used e.g. in washing machines. Their cap is made of sheet metal with an annular flange bent over a corresponding flange or an annular shoulder formed at the capsule body to hold the capsule cap and capsule body together with the diaphragm clamped in between. With other known diaphragm capsules of the kind set forth the ring is made as a separate sheet metal member put from above on a flange of the capsule cap and again bent so as to engage below an annular shoulder at the capsule body. In both cases the bending operation requires a separate apparatus whose structure and handling are rather complicated unless the capsule body and capsule cap are axially symmetrical. Final inspection of the diaphragm capsule is not possible before the ring has been bent because only then is the diaphragm clamped tightly between the capsule body and the capsule cap. Any deficiencies discovered during the final inspection practically cannot be eliminated because, in general, it would cost too much time and hardly be possible without destruction of the cap to separate the ring from the capsule body.

Therefore, it is an object of the invention to design a diaphragm capsule of the kind specified such that the capsule body and the cap can be assembled easily, at the same time, tightly clamping the diaphragm and that they can also be separated again, if required, at little effort and without any damage.

This object is met, in accordance with the invention, in that the ring comprises resilient segments separated by slots and locked behind the annular shoulder of the capsule body by means of noses formed at the inner side of the segments.

In a preferred embodiment of the invention the ring is cast or injection molded integrally with the capsule cap from plastics material. It is especially convenient if the ring is connected with the capsule cap by webs which are disposed above the slots separating the segments from one another and which leave free spaces whose dimensions in a plane parallel to the diaphragm are at least as large as the dimensions of the nose underneath which are parallel to them.

This embodiment has the special advantage that the capsule cap and the ring can be cast or injection molded together in a simple mold which includes but two axially movable mold members without any transversely movable slides. Such a mold can be so designed that the particular mold member forming the upper side of the capsule cap comprises stamps which form the spaces between the capsule cap and the ring as well as the inner walls of the resilient segments positioned underneath and the top faces of the noses. These stamps can be made without undercuts so that upon solidification of the structural group consisting of the capsule cap and ring including the resilient segments, the stamps can be withdrawn in axial direction through the free spaces mentioned. The other mold member essentially forms the underside of the cap and the slots between the resilient segments and, if desired, the outer faces of the segments which, however, may also be formed by the first mold member. The finished capsule cap together with the integral ring presents a structure with a number of perforations because of the free spaces mentioned, but which yet provides a tight diaphragm capsule together with the diaphragm and the capsule body since the diaphragm is clamped essentially radially within the spaces and webs between the capsule cap and body at its edge which, as usual, is preferably thickened.

Figure 2:
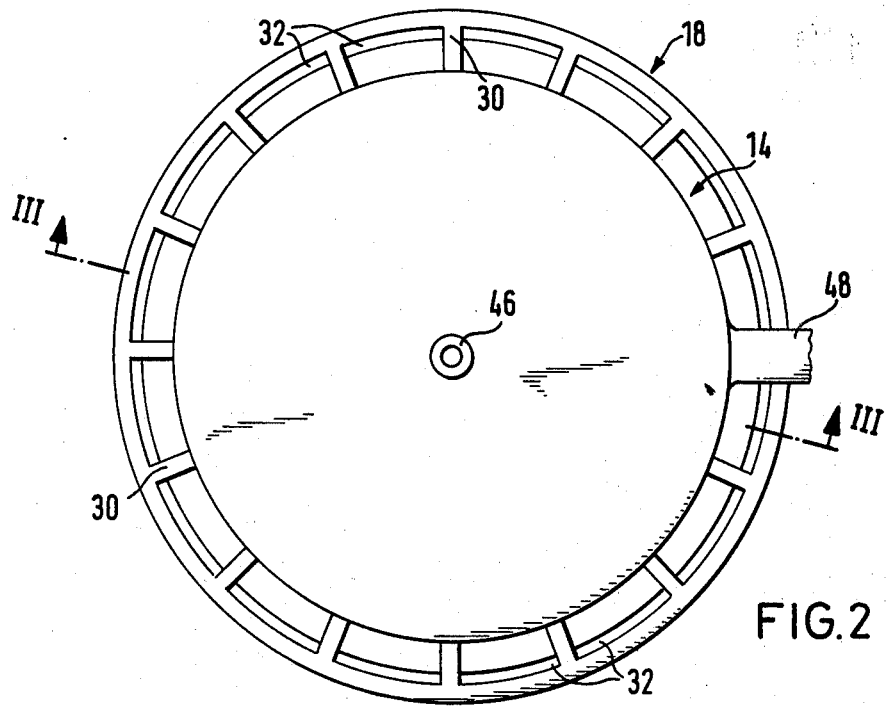
Figure 3:
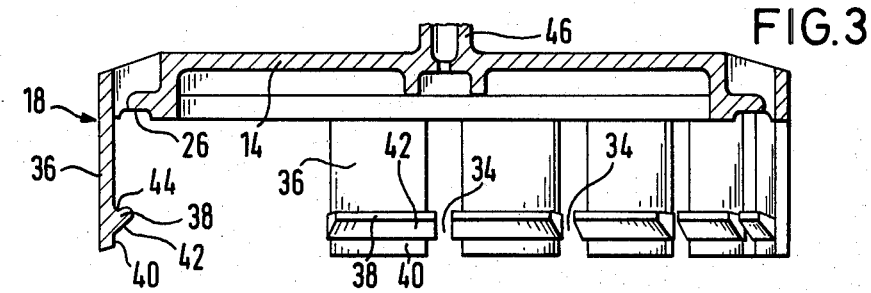

An embodiment of the invention will now be described in greater detail, with reference to diagrammatic drawings, in which:

FIG. 1 is an axial sectional elevation of a diaphragm capsule upon assembly of the capsule body, the diaphragm, and the capsule cap, FIG. 2 is the corresponding top view, FIG. 3 is an axial sectional elevation of the capsule cap alone, along line III—III of FIG. 2.

The principal components of the diaphragm capsule shown are a capsule body 12, for instance made of a bakelite polyester resin molding composition, a capsule cap 14 made of elastic plastics material, and a diaphragm 16 made of an elastomer, as well as a ring 18 which is integral with the capsule cap 14 and, with the diaphragm capsule assembled in accordance with FIG. 1, retains the capsule cap 14 at the capsule body 12 and the diaphragm 16 clamped between the two.

The capsule body 12, shown greatly simplified in FIG. 1, has a flange 20 at its open top and an undercut annular shoulder 22 formed at the underside of the flange. At its upper side the flange 20 has an annular depression 24 to receive the beadlike thickened edge 28 of the diaphragm 16 together with a complementary annular depression 26 in the capsule cap 14.

The capsule cap 14 is connected with the ring 18 by a plurality of webs 30 disposed at regular angular spacings, the ring substantially having the shape of a circular cylinder. Spaces 32 having the shape of circular ring sectors are provided between the webs 30. Below each web 30 the ring 18 has a slot 34 extending from the underside of the capsule cap 14 to the lower edge of the ring 18. The slots 34 divide the ring 18 into a corresponding number of resilient segments 36 each of which comprises a nose 38 at its inner side and slightly spaced above its lower edge, the nose functioning to lock behind the annular shoulder 22 at the capsule body 12.

Below the noses 38 the resilient segments 36 are formed with a cylindrical inner face 40 the inner diameter of which is greater than the outer diameter of the flange 20 by a few tenths of a millimeter. The transitions from the cylindrical inner face 40 to the noses 38 are formed as conical faces 42, the common apex of the cone being located above the capsule cap 14. This design of the lower area of the resilient segments 36 permits the ring 18 first to be put lightly on the flange 20 so as to center the two with respect to each other before any greater vertical force is applied which causes the noses 38 to evade the flange 20 radially outwardly and then lock behind the annular shoulder 22 when the capsule cap 14 has been pushed fully on the capsule body 12. At their upper side 44 the noses 38 are undercut complementarily to the annular shoulder 22 whereby the reliability of the locking engagement is improved.

The capsule cap 14 comprises an axially upwardly projecting connection socket 46 for a pressure hose. Instead of or in addition to this connection socket a radially outwardly projecting connection socket 48 may be formed at the capsule cap 14.

What we claim is:

1. A diaphragm capsule for pressure monitors comprising in combination:
 a. a capsule body;
 b. a capsule cap; and
 c. a diaphragm;

wherein said capsule body is formed with an annular shoulder; said capsule cap is integrally cast or injection molded of plastic material with a ring portion which includes a plurality of segments separated from each other by slots and each having a nose portion on the inner side thereof; said diaphragm includes an edge disposed and clamped between said capsule body and said capsule cap; said ring portion being operable to hold said capsule body, said capsule cap, and said diaphragm together in assembled condition with said nose portions engaged over said annular shoulder and the respective segments of said nose portions being in resiliently stressed condition, said ring portion and said capsule cap being integrally connected to each other by webs disposed above the slots separating said segments and leaving free spaces which in a plane parallel to said diaphragm are at least as large as the dimensions of the respective nose portions extending therebeneath in a plane parallel to said diaphragm.

* * * * *